(No Model.)

L. S. HEFNER.
SEED PLANTER, COVERER, AND FERTILIZER DISTRIBUTER.

No. 255,286.        Patented Mar. 21, 1882.

WITNESSES:
Thos Houghton.
John Kennon

INVENTOR:
L. S. Hefner
BY
ATTORNEYS.

N. PETERS. Photo-Lithographer, Washington, D. C.

UNITED STATES PATENT OFFICE.

LEWIS S. HEFNER, OF SPARKLING CATAWBA SPRINGS, NORTH CAROLINA, ASSIGNOR TO HIMSELF AND E. O. ELLIOTT, OF SAME PLACE.

SEED-PLANTER, COVERER, AND FERTILIZER-DISTRIBUTER.

SPECIFICATION forming part of Letters Patent No. 255,286, dated March 21, 1882.

Application filed June 15, 1881. (No model.)

*To all whom it may concern:*

Be it known that I, LEWIS S. HEFNER, of Sparkling Catawba Springs, in the county of Catawba and State of North Carolina, have invented a new and useful Improvement in Seed-Planters, Coverers, and Fertilizer-Distributers; and I do hereby declare that the following is a full, clear, and exact description of the same, reference being had to the accompanying drawings, forming part of this specification, in which—

Figure 1:
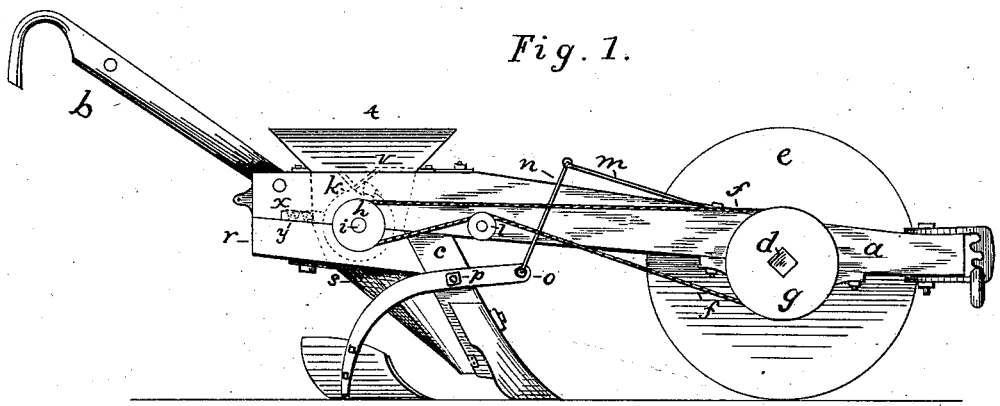
Figure 2:
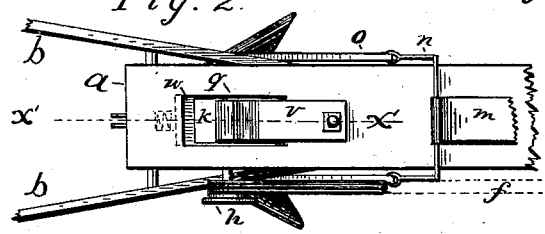
Figure 3:
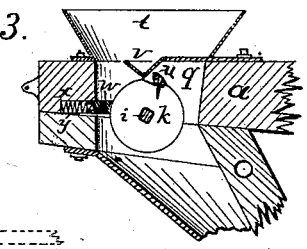
Figures 4, 5:

Figure 1 is a side elevation of my improved seed-planter, coverer, and fertilizer-distributer. Fig. 2 is a top view of the sowing mechanism with the hopper removed. Fig. 3 is a vertical central section in the line $x'\ x'$ of Fig. 2, and Figs. 4 and 5 are detail views.

My invention relates to improvements in seed-planters, coverers, and fertilizer-distributers; and it consists in the peculiar construction and arrangement of the parts, as hereinafter more fully set forth.

In the accompanying drawings, $a$ represents the beam, $b\ b$ the handles, and $c$ the standard, of a plow, all of the usual construction. Near the outer end of the beam a circular hole is made transversely near its lower face and extending across the upper face of a short block bolted to the under face of the beam for the reception of an axle, $d$, cylindrical in its middle and journaled in the beam and block, and having squared ends, one of which passes through a square hole in a wheel, $e$, resting on the ground and supporting the plow-beam, and revolving with the axle $d$, the opposite squared end of the latter passing through a square hole in the band-pulley $g$, so that the wheel $e$ and band-pulley $g$ revolve with the axle $d$ in the forward movement of the plow. A band, $f$, passes around the band-pulley $g$, its upper portion passing thence over a pulley, $h$, on the axle $i$ of a dropping-wheel, $k$, thence over a guide-pulley, $l$, back to the pulley $g$, whereby in the forward movement of the plow the dropping-wheel $k$, hereinafter described, is revolved to drop the seed. By employing band-pulleys $g$ of different diameters the distance apart of the seed can be regulated as desired.

$m$ represents a spring, secured at one end to the upper face of the plow-beam in front of the plow, and having the bail $n$ secured to its rear free end, and the lower ends of the arms of the bail pivotally connected with the upper ends of the curved standards $o\ o$. The curved coverer-standards $o\ o$ are pivoted to the upper part of the plow-standard by means of a horizontal bolt, $p$, passing through the plow-standard, on which the coverer-standards are pivoted. The horizontal bolt $p$ is provided with right and left screw-threads near its ends, provided with two nuts on each end, between each pair of which a coverer-standard is held. By this construction the coverer-standards, one provided with a right and the other with a left share, secured to their ends, may be readily adjusted laterally, so as to cover deep or shallow, as may be desired.

$q$ represents a slot made in the plow-beam near its rear end.

$r$ represents a box, detachably bolted to the rear end of the plow-beam under its slot, and provided with journal-bearings for the axle $i$ of the dropping-wheel $k$, and an open bottom for the escape of seed down the feed-spout $s$, secured at its upper end to the lower face of the box $r$, and secured near its lower end to the back face of the plow-standard, so that the seed fall directly into the furrow made by the plow. A hopper, $t$, is arranged over the slot $q$ in the rear end of the beam for the reception of the seed to be planted.

$k$ represents the dropping-wheel on the axle $i$, and is arranged directly under the hopper, and revolves in the slot $q$ and box $r$. The dropping-wheel $k$ is provided with a recess in its circumference, having one edge thereof cut away. In this recess in the dropping-wheel a plug, $u$, provided with a central hole and screw to secure it in place, is inserted, the upper face of the plug projecting up above the circumference of the dropping-wheel, and leaving a space for the reception of seed between the cut-away portion of the circumference of the dropping-wheel and the side face of the plug $u$. The plugs $u$ are made of several sizes or lengths, and are detachable and interchangeable, in order to regulate the number or quantity of seed to be sown. In the revolution of the dropping-wheel the upper face of the plug raises the free end of the spring $v$, lying in the slot $q$ and secured at its outer end to the upper face of the beam, allowing the seed to be carried around and over the seed-tube and discharged therein. The function of the spring $v$ is that of a cut-off to prevent the seed from being carried into the seed-tube until carried there by the dropping-wheel.

To prevent the seed from escaping at the rear end of the box $r$, I insert a piece, $w$, across the box, and arranged in recesses $x\ x$.

$y$ represents a spring, one end bearing against the back face of the cross-piece $w$ and the other end resting against the rear end of the recess, the tension of the spring being exerted to force the piece $w$ forward and prevent the falling out of the seed through the bottom of the box.

What I claim as my invention is—

1. The combination, with a plow provided with a seed-dropper depositing seed in the furrow made by the plow, of the spring $m$, bail $n$, secured to the free end of the spring, coverer-standards $o\ o$, carrying right and left plows, and pivotally secured to the lower ends of the bail-arms and pivoted to the horizontal bolt $p$, having right and left screw-threads provided with nuts, whereby the spring-coverers may be adjusted laterally, substantially as described.

2. The dropping-wheel $k$, provided with a recess in its circumference, having one edge cut away, in combination with detachable and interchangeable plugs $u$, substantially as described, and for the purpose set forth.

3. The combination, with a plow provided with the supporting-wheel $e$ and detachable and interchangeable band-pulleys $g$, of the band $f$, axle $i$, carrying the pulley $h$, and recessed dropping-wheel $k$, having detachable and interchangeable plugs $u$, detachable box $r$, spring $v$, and piece $w$, having spring $y$, substantially as described, and for the purpose set forth.

LEWIS SIDNEY HEFNER.

Witnesses:
L. C. SIGMAN,
H. A. HERMAN.